Dec. 14, 1937.  G. A. TINNERMAN  2,102,229

FASTENING DEVICE

Filed June 17, 1936

INVENTOR.
GEORGE A. TINNERMAN
BY Bates, Goldrick, & Teare
ATTORNEYS

Patented Dec. 14, 1937

2,102,229

UNITED STATES PATENT OFFICE 2,102,229

FASTENING DEVICE

George A. Tinnerman, Rocky River, Ohio, assignor to Albert H. Tinnerman, Cleveland, Ohio Application June 17, 1936, Serial No. 85,750

3 Claims. (Cl. 85—32)

This invention relates to spring fasteners and particularly to those which have yieldable tongues that are adapted to engage the shank of a bolt or the like fastening member and to effect a locking action by means of the yieldable characteristics of the tongues.

Spring fasteners of the type referred to have well-defined and accepted properties of satisfactorily exerting a clamping pressure through the medium of flexible members which extend upwardly from the base portion and which are drawn downwardly toward the base portion, as the bolt is turned. I have found, however, that whenever the bolt is turned sufficiently far to draw the tongues downwardly that the advancing corner of one of the tongues engages the work to be joined before any other part of the tongues engage the work, wherefore, continued turning of the bolt results in a localization of pressure adjacent the corner that is in contact with the work, and as a consequence the thread is stripped. In addition if the clearance between the bolt and the bolt opening in the part to be joined is sufficiently large, the tongues are apt to be pulled downwardly into the opening sufficiently far that they slip or snap by the threads of the bolt, thereby destroying the value of the fastener for its intended purpose.

An object of my invention, therefore, is to provide a spring fastener wherein the advantages of yieldability are preserved, and wherein load stresses are distributed uniformly throughout a complete turn of a bolt thread. Thus, I accomplish the combined result of a yieldable fastener, and at the same time, eliminate the hazard of "stripping" the thread. This result has opened a wide field of usefulness for spring fasteners particularly where production requirements include the use of power-actuated screw drivers.

An additional object includes the provision of a fastener which retains the yieldable characteristics, and which eliminates the possibility of any portion being pulled downwardly sufficiently far to slip past the threads on the bolt. In this connection my invention assumes different forms as will hereinafter be pointed out in detail in the following description.

Figure 1:
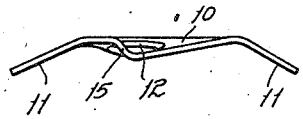
Figure 2:
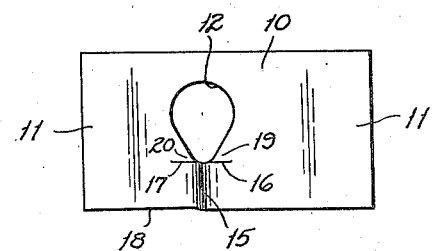
Figure 5:
Figure 3:
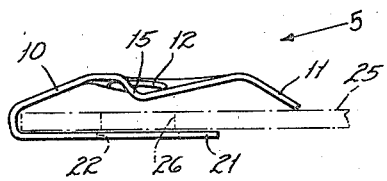
Figure 6:
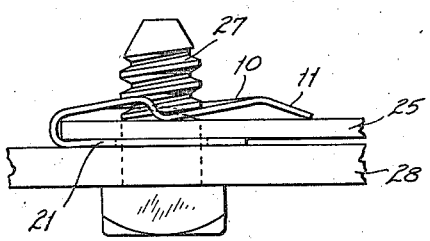
Figure 4:
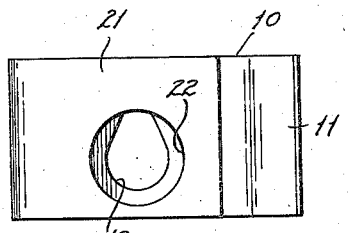
Figure 7:
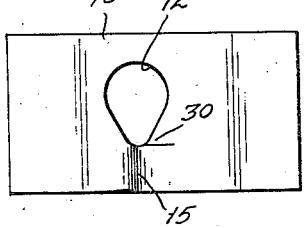
Figure 8:
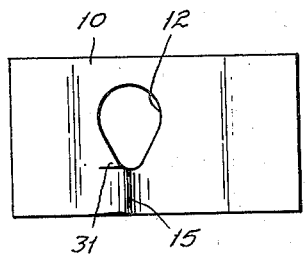

In the drawing, Fig. 1 is a side view of a fastener embodying my invention; Fig. 2 is a top plan view of the fastener shown in Fig. 1; Fig. 3 is a side view of a spring fastener embodying a modified form of construction; Fig. 4 is a bottom view of the fastener shown in Fig. 3; Fig. 5 is an end view of the fastener illustrated in Fig. 3 when viewed, as indicated by the arrow in Fig. 3; Fig. 6 is a side view of a fastener illustrated in Fig. 3 when a bolt is inserted therethrough, and Figs. 7 and 8 are plan views of spring fasteners showing modified forms of construction.

The spring fastener, which is shown in Fig. 1 comprises a body portion 10 which has its ends 11 bent downwardly for engaging the work and for imparting to the body portion an arched construction by means of which the tightening action of a bolt is resiliently resisted. The bolt opening is made in the body portion adjacent the midportion thereof and comprises an irregularly shaped opening, a part of which is illustrated, as being semi-circular and the balance of which is shown as having an area larger than that of the semi-circular portion. The opening may be termed egg-shaped although the construction is not limited to the particular shape shown. As illustrated, however, the opening has the minor axis substantially equal to the inside diameter of the thread on the bolt with which the fastener is intended to be used, while the major axis is preferably slightly larger than the outside diameter of the bolt thread.

To make the fastener conform to the helix of the bolt thread, I offset the body portion as at 15 in a transverse direction and substantially in a region that is co-extensive with the major axis of the bolt opening. The extent of the offset is substantially the same as the pitch distance of the bolt thread, wherefore the bolt can be readily started in threaded engagement with the fastener. To facilitate the entrance of the bolt, I may slit the fastener, as indicated at 16 and 17 on a line that extends substantially parallel with the longitudinal edge 18 and adjacent the small end of the opening. These slits provide tongues 19 and 20 which serve to increase the resiliency of the fastener during the bolt turning operation. If desired, the tongue 19 may be bent downwardly slightly and the tongue 20 may be bent upwardly slightly during the forming operation so as to further facilitate the entrance of the bolt into the fastener.

A fastener, which is made in accordance with my invention distributes the clamping stresses uniformly throughout the body portion because the offset portion provides a connecting bridge between the points of thread entrance and departure, as a result of which the thread cannot be stripped, and the tongues cannot be pulled through the bolt opening.

A modification of my invention is shown in Figs. 3 to 6 in which one end of the body portion is provided with an extension piece 21 that projects toward the other end and preferably in an unbroken plane. The extension projects beyond the midportion of the body and has a bolt-receiving opening 22 which is in alignment with the opening 12. The opening 22 however is preferably circular and has a diameter that is larger than the outside diameter of the bolt thread. By bending the extension backwardly upon the body portion as is shown in Fig. 3 the fastener assumes the form of a clip which can be inserted endwise over a part 25 to be joined. Such part has the necessary bolt receiving opening in registration with the openings 12 and 22. The preformed relationship between the body and the extension is preferably such that the fastener must be sprung apart slightly to admit the part 25, after which the spring tension holds it securely in place until the bolt is inserted therethrough. This is very helpful for positioning the fastener in blind locations where it would normally be difficult of access to an operator.

Before the bolt is inserted into the fastener shown in Fig. 3 the midportion of the body is out of contact with the work, wherefore the arched characteristic of the body imparts resiliency which yieldably resists the clamping action of the bolt, and which provides the necessary spring tension to prevent the fastener from becoming loose. In Fig. 6 the bolt is indicated at 27 as being tightened and as being used for locking the parts 25 and 26 together. In such illustration it is to be noted that the lower part of the offset portion is drawn into abutting engagement with the work and that there is still some resiliency in the arched part of the body.

In Fig. 7, I have shown a modification of the invention, wherein the fastener instead of having two tongues as is illustrated in Fig. 2 has one tongue 30 which constitutes the point of entrance for a right-hand thread. In Fig. 8, the tongue is indicated at 31, as being the point of departure for a right-hand thread. In each case, the body portion is offset at 15 in the same manner as heretofore explained. In addition the modifications may be used either with the fastener in the form illustrated in Fig. 1 or the form illustrated in Fig. 3.

A spring fastener which is made in accordance with my invention is advantageous in that the fastener will not strip the bolt thread notwithstanding the fact that the bolt is turned to a much greater degree than is necessary to obtain the desired clamping pressure. This result is obtained without sacrificing the resilient features of the fasteners, and without weakening the body to an extent that will allow any part of it to snap past the threads.

I claim:—

1. A threadless fastener comprising a metallic strip having substantially parallel longitudinal edges and having a bolt receiving irregular opening therein, the fastener having a slit extending substantially tangentially to one end of the opening and also substantially parallel to one of the longitudinal edges, the slit cooperating with the opening to provide a single yieldable tongue which is adapted to be moved with reference to the body portion.

2. A threadless fastener comprising a one-piece sheet metal strip having a body portion the thickness of which is less than the pitch of the thread on a bolt with which the fastener is intended to be used, the body having an irregular bolt-receiving aperture therein and having a shouldered offset on the narrowest part thereof and only on one side thereof, the body having a serration extending at a right angle to the offset and tangentially to the aperture, the serration operating to form a tongue adjacent the offset, and the body having an extension that extends downwardly and inwardly and that has a bolt receiving opening therein in registration with said aperture.

3. A threadless fastener comprising a one-piece sheet metal strip having a thickness less than the pitch distance of the bolt thread with which the fastener is intended to be used having an arched formation and having an egg shaped bolt receiving aperture therein, the fastener having an offset extending from the small end of the opening to the nearest edge of the fastener and having serrations extending in opposite directions from the opening, said serrations providing tongues by means of which the portion of the fastener surrounding the opening may be shaped to conform to the helix of the thread with which the fastener is intended to be used.

GEORGE A. TINNERMAN.